United States Patent [19]

Weitz et al.

[11] Patent Number: 4,937,807
[45] Date of Patent: Jun. 26, 1990

[54] SYSTEM FOR ENCODING SOUND RECORDINGS FOR HIGH-DENSITY STORAGE AND HIGH-SPEED TRANSFERS

[75] Inventors: John C. Weitz, Belmont; Hugh Macdonald, Menlo Park, both of Calif.

[73] Assignee: Personics Corporation, Redwood City, Calif.

[21] Appl. No.: 108,617

[22] Filed: Oct. 15, 1987

[51] Int. Cl.$^5$ .................... G11B 3/74; G11B 11/00
[52] U.S. Cl. ................................. 369/85; 369/15
[58] Field of Search ............. 340/347 DD; 369/14, 369/15, 84, 85, 59; 360/15, 32, 51

[56] References Cited

U.S. PATENT DOCUMENTS

| | | | |
|---|---|---|---|
| 4,355,338 | 10/1982 | Yamamoto et al. | 360/15 |
| 4,521,870 | 6/1985 | Babbel et al. | 360/13 |
| 4,646,171 | 2/1987 | Odaka et al. | 360/32 |
| 4,672,480 | 6/1987 | Yamamoto | 360/32 |

*Primary Examiner*—Vincent P. Canney
*Attorney, Agent, or Firm*—Flehr, Hohbach, Test, Albritton & Herbert

[57] ABSTRACT

Method and apparatus for addressably writing digital representations of high-fidelity sound recordings in a non-mapped digital storage device, such as a CD music ROM, using conventional PCM (pulse code modulated) equipment, but in a more condensed and efficiently sampled ADM (adaptive delta modulated) format thereby providing high-density addressable storage of several thousand recordings in a single music ROM jukebox as well as high-speed information transfers. The invention enables communication and control links between conventional digital audio processors and conventional microcomputers. Timing data is embedded in the ADM formatted and blocked data file. The microcomputer is utilized for editing ADM data, inserting catalog data, and transferring the data file to a standard PCM file writer suitable for making non-mapped CD music ROMs containing addressable ADM data files on conventional equipment utilized in the indstry. Encoding is performed by Dolby delta-link ADM encoding to achieve time-domain condensation of information content, and analog signals representing the sound recording are peak-limited prior to preprocessing by Dolby B noise reduction techniques. CD music ROMs produced thereby are utilized in high-speed reproduction systems or for addressable computer access in high-volume archival storage systems.

26 Claims, 3 Drawing Sheets

ENCODING/PREMASTERING SYSTEM

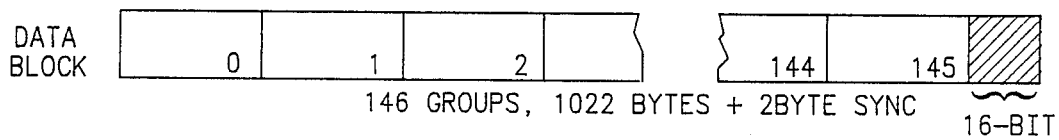
FIG. 2A
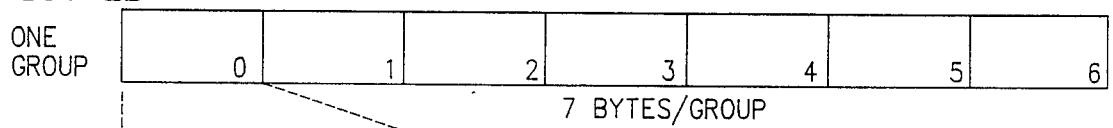
FIG. 2B
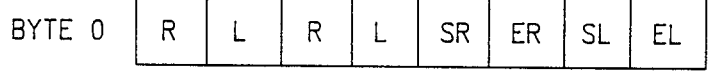
FIG. 2C
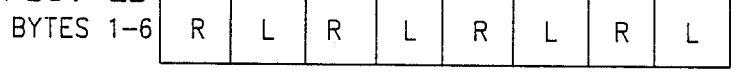
FIG. 2D
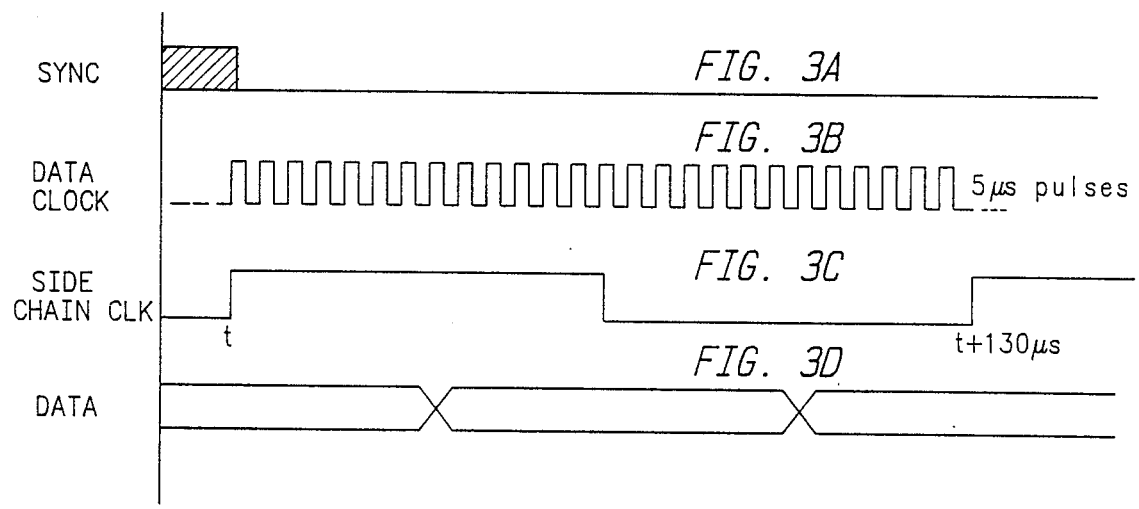

4,937,807

SYSTEM FOR ENCODING SOUND RECORDINGS FOR HIGH-DENSITY STORAGE AND HIGH-SPEED TRANSFERS

CROSS-REFERENCES TO RELATED PATENT AND PATENT APPLICATIONS

This invention also relates related to commonly owned allowed U.S. Patent Application titled "High-Speed Reproduction Facility for Audio Programs" filed of even date herewith, and incorporated herein by reference.

This invention also relates to commonly owned U.S. Patent Application titled "Bias Control In Apparatus For Tape Recording" filed of even date which we also incorporate herein by reference.

BACKGROUND OF THE INVENTION

The present invention pertains to a method and apparatus for making encoded master recordings of high-fidelity music to enable subsequent storage and retrieval by low-cost data processing techniques. More specifically, the invention relates to a system for storing encoded digital representations of sound recordings on a high-density storage media and for writing other indexing and/or indicia information associated with the program to enable accessing, playback and handling at high speeds.

A significant problem addressed hereby is retaining high sound fidelity in large volumes of digital representations for sound recordings. Unlike voice data handled by conventional telephone networks for low data transfer rates at user terminals, sound recordings of musical selections require substantial bit rates for real time transfers. Only complex and expensive digital data processing system can handle transfer rates required of conventional digital (e.g. 16-bit PCM) high-fidelity sound recordings, e.g., real time transfer rates of several hundred kilobytes per second and storage capacities of ten megabytes for each minute of high-fidelity music. Even greater demands must be met for high-speed transfers.

Attempts have been made to provide a practical store of concentrated digital representations of plural sound recordings (e.g., several thousand) which were immediately retrievable and reproducible, but current digital audio systems lack this capability. The well-known CD music ROM disks encoded by the conventional 16-bit PCM (pulse code modulated) technique hold some promise, but current off-the-shelf data processing systems are incompatible with them both in addressing algorithms and in transfer rate compatibility.

As an example, a juke box for retrieving and playing an audio program is known, but the information storage media have limited capacity using conventional formats. A practical system requires gigabytes of storage and data transfer rates of several magabytes/second in a form compatible with standard data processing equipment. A conventional desktop processing system has an effective data transfer rate of only 100 to 200 kbytes/seconds. PCM (pulse-code-modulation) encoded music, for example, requires a minimum data transfer rate of about 176 kbytes/second while faster-than-real-time recording, say eight times, would require a transfer rate of 2.8 megabytes/second. Sixteen-bit PCM encoded music requires about ten megabytes of storage for each minute of music. In light of these constraints, it is evident that present techniques provide neither high-speed transfers of re-recording, nor do they provide high volume archiving. Some prior systems including subject matter related to this invention are described in U.S. Pat. Nos. 4,528,643; 3,444,334; 4,410,917; 3,947,882; 3,718,906; 3,609,227; 4,355,338; and 3,311,378.

In view of the foregoing, it is a general objective of the present invention to provide a method and apparatus for storage and handling digital data representations of high-fidelity sound recordings by low-cost data processing techniques for high-density storage and/or high-speed transfer.

Another objective is to provide a method and apparatus for combining digital audio processing systems and techniques with low-cost digital data processing systems and techniques for handling audio program data.

It is a specific objective of the present invention to enable realization of a practical distribution and reproduction system for suitable for reproducing customized selections of audio programs of high fidelity at high speeds wherein the programs are reproduced on a slave recording medium directly from a high volume archive of master programs.

It is yet a further objective of the present invention to solve concerns of poor fidelity, deterioration of recording medium, limited selection of programs, inherent in many present-day storage media.

It is a further objective of the present invention to provide means that enable faster-than-real-time transfer of high-fidelity audio programs.

It is yet a further objective to provide a practical information store or archival system for premastering original master recordings in order to reduce the quantity of storage space required for a multitude of selections while at the same time enabling high-speed and high-fidelity reproduction thereof.

Another objective of the invention concerns developing a premastering system comprising time-domain condensed digital data signals representing audio programs which system enables storage of a large quantity of programs in a relatively small storage space.

SUMMARY OF THE INVENTION

In accordance with the foregoing objectives, the invention comprises a method and apparatus useful in a data processing environment for encoding high-fidelity sound recordings; editing the encoded data to add timing, catalog, and/or other indicia information; and storing indicia information and high-fidelity digital representations of the recordings in an information storage medium in a condensed format to enable high volume storage, direct access and high "information" throughput in a data processing environment.

The preferred method includes the steps of reproducing analog or digital representations of master sound recordings, peak-limiting the amplitude and pulse duration of the resultant analog signals, processing the peak-limited audio by Dolby B noise reduction techniques when necessary for compatibility with limitations of the slave media, encoding the processed analog signal to form efficiently sampled or condensed digital representations thereof along with embedded timing information, interfacing the encoded digital representations with a data processing system for further editing and manipulation, writing the edited and manipulated digital data using standard PCM equipment for subsequent writing on a CD music ROM. The editing step may also include information relative to the length of the sound recording.

The preferred apparatus comprises means for encoding sound recordings to produce condensed digital representations thereof, means for interposing timing data in the encoded digital data representations, means for interfacing the digital data representations with a data processing system which includes means for editing and writing a data file representing the encoded sound recording, means for writing the data file to PCM equipment for subsequent writing in a CD music ROM. Digital encoding preferably is accomplished by Dolby delta-link adaptive delta modulation (ADM) in order to obtain efficiently sampled or condensed data representations of the sound recordings for high information throughput in the data processing system. However, other "condensed" techniques or high-efficiency analog-to-digital sampling techniques may be employed.

Significantly, the present invention enables quick access to and transfers of high-fidelity sound recordings at greater-than-real-time speeds. It also permits high-density storage of several thousand sound recording in a few cubic feet of space.

Other aspects, features and advantages of the invention will become apparent upon review of the succeeding disclosure and taken in connection with the accompanying drawings. The invention though is pointed out with particularity by the appended claims.

BRIEF DESCRIPTION OF THE DRAWINGS

FIG. 2 depicts a preferred data blocking structure chosen for manipulating digital audio data according to an aspect of the present invention.

FIGS. 3(a) through (d) are timing diagrams illustrating data emissions of digital audio data encoded by an adaptive delta modulation technique in accordance with one aspect of the present invention.

DESCRIPTION OF THE ILLUSTRATIVE EMBODIMENT

I. General Overview

The apparatus uses several components, several of which are already commercially available. Other components of the invention which we modified or developed ourselves are described in detail. For the sake of convenience, we describe herein a reproduction system operating at eight times real-time speeds, e.g. 8X, although other speeds can be chosen. We also chose to describe CD music ROMs as an encoded master medium and magnetic tape cassettes as a slave medium, although the invention has application to other media, such as data storage disks, vinyls, and magnetic tapes, etc. Using CD music ROMs, we attained storage of 15,000 individual music selections in just a few cubic feet of space.

Two alternative encoding methods were contemplated—a first being data condensation after A/D conversion of source programs during the premastering process, and a second being the use of a higher efficient sampling system during A/D conversion, e.g., higher than conventional 16-bit PCM encoding. For example, a standard 16-bit PCM system, if used for 8X replication, requires a throughput of about 1.4 megabytes/second which cannot be met with prior systems such as that described in U.S. Pat. No. 4,528,643 to Freeney.

Figure 1:
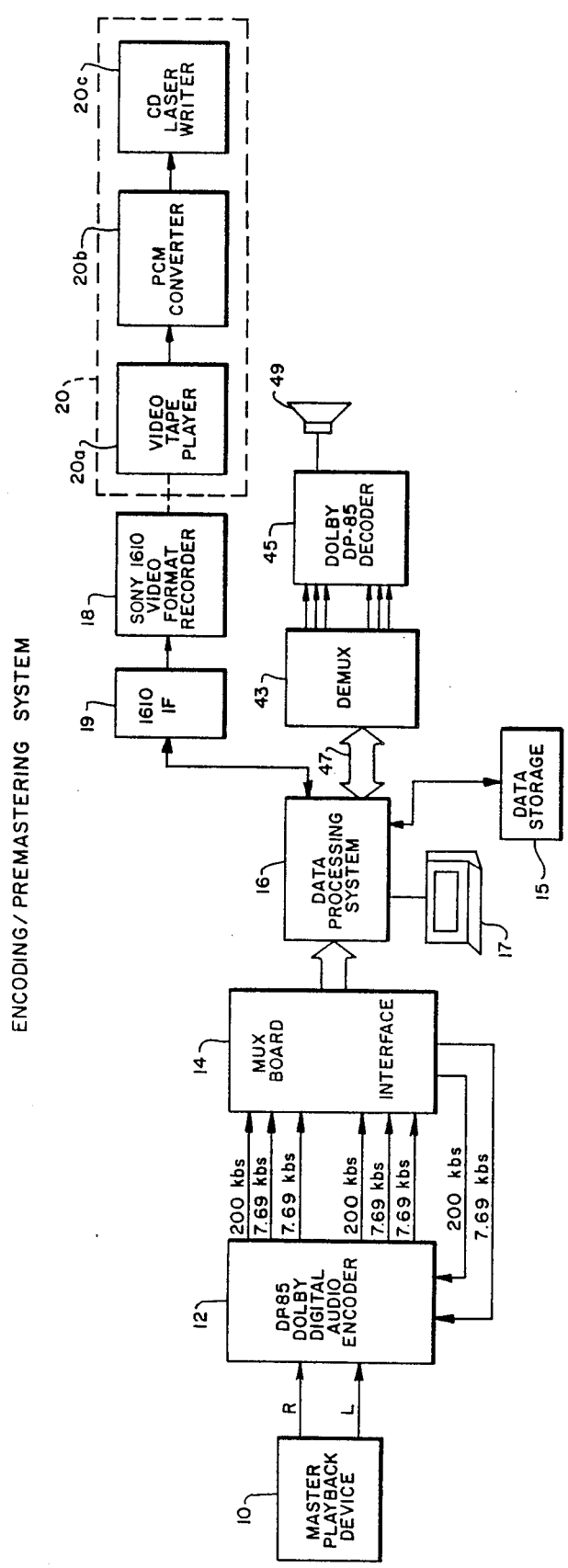
FIG. 1 is a system block diagram of a premastering system useful for encoded representations of sound recordings in accordance with the present invention.
Figure 4:
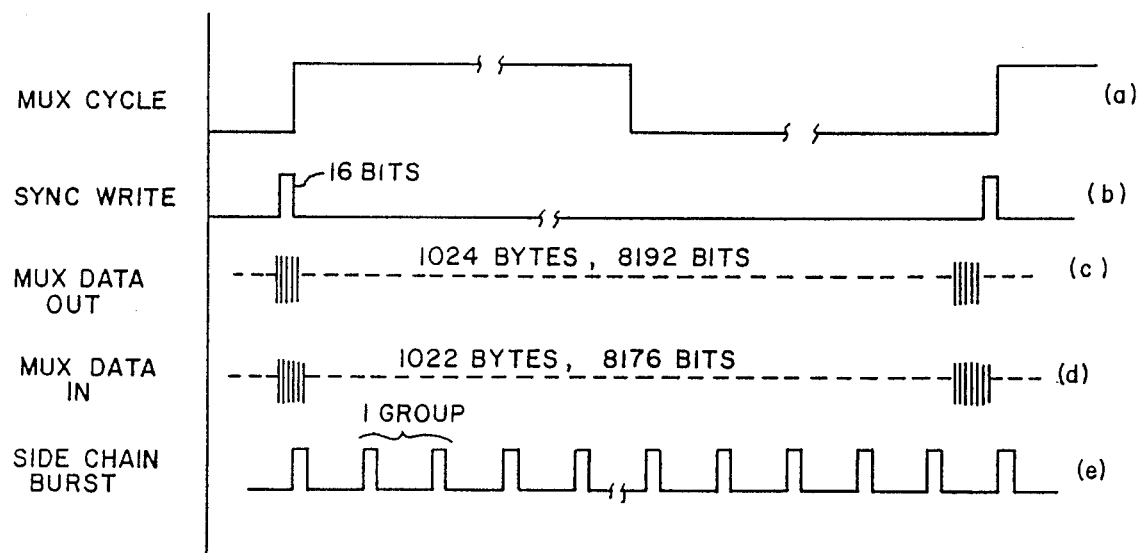
FIGS. 4(a) through 4(e) are timing diagrams illustrating the relationship among various signals.

In the encoding/premastering system of FIG. 1, we chose to encode masters using the Dolby delta-link adaptive delta modulation (ADM) technique described in AES (Audio Engineering Society) Paper No. 2071, 75th Annual Convention, Paris 1974 by Todd, et al. Upon decoding, the Dolby Delta-link ADM system utilizes a delta decoding integrator attached to both a step-size restorer to avoid slope overload and a sliding-band voltage-controlled equalizer which serves to mask noise psychoacoustically by concentrating channel energy in the area containing stochastic, e.g., non-correlated audio information while minimizing transfer of audio redundancies. In actual practice of the invention, we chose to use a data channel sampling rate of 200 kb/s having associated side chain rates of 1/26th of the channel sampling rate for step-size and emphasis control.

Using the above-described sample rate, Dolby ADM encoded data has a 3.2:1 density advantage over conventional 16-bit pulse code modulation (PCM) data, and for this reason we realize this same efficiency advantage over PCM. However, PCM data handling and processing techniques have the advantage of being well developed in terms of available equipment for playback and recording in the music industry, so we developed a method and apparatus for writing ADM data, along with other indicia and identifying data, into industry-standard format on CD music ROMs, and interfacing the PCM and ADM systems with a data processing system. Problems encountered include interfacing digital audio data with data processing system for editing and manipulation, data blocking and sync writing for a non-address-mapped CD music ROM medium, and interfacing edited and manipulated data with PCM systems for making CD music ROMs.

A preferred arrangement of a high-speed reproduction system includes low-cost data processing system which receives purchaser information from an order entry terminal (not shown here) via a communication link. The purchaser information may take the form of digital identification data that specifies unique audio programs to be compiled, as well as other associated information, such as, pricing, title or author information. It may also include customer's name and title to be printed on the card that accompanies the final output media. Order entry information may emanate from a local area network which couples an order entry terminal directly located at the same premises as the high-speed reproduction system, or alternatively, may be communicated from distant locations via link, such as, telephone lines. However, no music data is transferred over long distances.

In response to the order entry information, the data processing system, by way of a user terminal, controls high-speed information flow between CD music ROM drives, on one hand, and a plurality of cassette controllers to produce a customized selection of audio programs requested by a purchaser. Custom labels are simultaneously printing for affixation to the slave media.

In an alternative embodiment, we incorporated a peak limiter and Dolby noise reduction device in the premastering system so as to improve fidelity of cassette tapes when they serve as the slave media. This aspect of the invention is described in commonly owned application titled "Bias Control In Apparatus For Tape Recording", Ser. No. 109,190, filed of even date, which we incorporate herein.

II Encoding/Premastering System

A. System Concept

Referring to FIG. 1, the preferred encoding or premastering system includes a conventional audio playback device 10 for producing left and right analog stereo signals, a Dolby ADM audio encoder 12 for converting the stereo signal pair to ADM six digital data streams, an interface 14 for multiplexing and data blocking the ADM data streams, a data processing system 16 which performs a variety of functions including editing and manipulating, a PCM processor 18 coupled to the data processing system 16 for making a standard 16-bit PCM data tape contain ADM data, and CD music ROM recorder system 20 for writing the edited and manipulated ADM data from the PCM processor 16 on a master for later replication of quantities of CD music ROMs. The CD music ROM recording system may be located at a remote tape making manufacturing site in which case a separate video format playback unit could be coupled to a PCM video data decoder similar to that coupled to a local facility. The system 20 preferably is a remote commercial facility which converts PCM tapes to CD music ROM disks, and includes a 1610 tape player 20a, a digital PC converter 20b, and a CD music ROM laser writer 20c.

A 1X demultiplexer unit 43 and Dolby decoder 45 couples the data processing system via bus 47 for providing real time playback during the editing and premastering process. Listening device 49, such as a speaker or a pair of headphones, provide human interface.

B. Master Playback Device 10

The playback device 10 comprises a conventional player which produces left-right stereo analog signals, and supplies the same to the Dolby encoder 12. Since original master recordings can originate from magnetic tapes, CD music ROMs, or other media, device 10 may take on a variety of forms. Stereo audio programs are most desirable, but programs originating on a single channel (e.g. mono) may also be reproduced.

C. Dolby DP-85 Digital Audio Encoder 12

In the case of starting with analog audio signals of a master recording, we utilized a Dolby encoder 12, model DP-85 ADM digital audio processor, manufactured by Dolby Systems, Incorporated of San Francisco, California. The encoder 12 provides some flexibility in choosing a sampling rate of the analog signals. It receives left-right analog stereo signals and generates six digital data streams akin to the Delta-link processing technique. For each stereo channel, processor 12 outputs a 200 kilobits/second (kb/s) audio data stream as shown in FIG. 3(b) and two 7.69 kb/s side data stream of emphasis and step-size, respectively as shown in FIG. 3(c), which control the decoders equalization and step-size parameters. This rate is chosen because it provides excellent fidelity while discarding audio material that could not be heard on the cassette tape due to its bandwidth and dynamic range limitations. However, when using slave media other than cassette tapes, such as a compact disk, the Dolby sampling rate would be increased to match the characteristics of this media. Optionally other data condensation techniques might be employed. In any event, the audio data stream from the Dolby encoder represents sampled analog audio signals from the respective audio channels.

D. ADM To DPS Interface 14

ADM/DPS interface 14 of FIG. 1 performs multiplexing operations generates clocking signals for the Dolby encoder 12 for each stereo channel. It converts the ADM bit serial streams to a form compatible with an 8-bit parallel bus. The clocking signals are 5 $\mu$s and 130 $\mu$s clock pulses, respectively, for the channel data and side chain data streams.

According to its timing operation, a 4-bit nibble of side chain data is accumulated and written in a buffer in burst mode every six-and-a-half bytes of channel data in order to attain the a full seven-byte group as shown in FIG. 2(b). In this case, a first byte zero of the group contains four bits of channel data and four bits of side chain data, as depicted in FIG. 2(c), while the remaining bytes of the group each contain eight bits of channel data, as depicted in FIG. 2(b). Interface 14 also converts the rather unique Dolby ADM data streams to a form suitable for processing by the processor 16. Depending on the input requirements of the data processing system 16, data may be transmitted serially or in parallel. In the preferred implementation as shown in FIG. 1, interface 14 blocks the data into 1024-byte data blocks as indicated in FIG. 2(a), writes a unique 16-bit sync word in the last two bytes that is utilized in the high-speed reproduction system described below, and transmits them in 8-bit wide bytes to an input port of the data processing system. The 1024-byte data blocks form the basis by which music data can be manipulated and stored in the data processing system 16 and retrievably written on a non-mapped CD music ROM comprising the master medium.

E. Data Blocking & Timing Scheme

With reference to FIGS. 2(a), 2(b), 2(c), 3 and 4, the preferred data blocking structure produced by interface 14 conveniently packs ADM audio data into one-hundred-forty-six groups of seven bytes each, totaling 1022 bytes, during each cycle of the interface 14. Timing operation of the multiplexer 14 are derived from constraints imposed by the data blocking scheme depicted in FIG. 2. In explanation of the ADM data codes in FIG. 2, L=left channel audio data bit
R=right channel audio data bit
EL=left channel emphasis data bit
ER=right channel emphasis data bit
SL=left channel step size data bit
SR=right channel step size data bit The first byte in each group (byte zero) contains side chain data bits (SR, ER, SL, EL) whereas the remaining bytes contain channel data bits (L, R). Since side chain data is generated by 130 $\mu$s clock pulses of encoder 12 as shown in FIG. 3(c), interface 14 accumulates a 4-bit nibble of side chain data every 130 $\mu$s and appends the nibble to a 4-bit nibble of channel data in a "burst" data transfer operation as shown by side chain data burst pulses in FIG. 4(e). The burst pulses occur once during each 7-byte group. Data from the data channel of encoder 12 is clocked out by data pulses of FIG. 3(b). With the two-byte (16-bit) sync word appended to the 1022-byte ADM data, the interface compiles a fully occupied 1024-byte data block which advantageously can be stored in and retrieved from a conventional data storage device 15 (FIG. 1) coupled to the processor 16 without "gaps" in the data file.

The total bit rate transfer from Dolby encoder 12 to interface 14 is 430.77 kbs (kilobits/second) or 53.85 kBs (kilobytes/second) at 1X speed, e.g., real time speed. However, because interface 14 adds a 16-bit sync word, the actual bit rate transferred to the processing system 16 is slightly higher. Thus upon decoding this data, time-base correction is employed to retrieve the precise real time clocking relationship of the information stored in the CD music ROMs constituting the master. As depicted in FIGS. 4(c) and 4(d), 1024 bytes are transmitted by the interface 14 in the same time period of receiving 1022 bytes of ADM data. Thus upon decoding, the 1022-byte information block is "stretched out" to the 1024-byte time period. In this fashion, time-base corrected data output from the CD music ROM bears a defined relationship with the real time recording period so as to accurately recover the ADM clock pulses and achieve reproduction at precise multiples of real time.

F. Sync Word

The preferred 16-bit sequence comprising the sync word is hexadecimal "AAAA" and was determined by histographic analysis to be one of least occurrence in the data bit stream. Interface 14 writes the sync word at the end of each data block upon transmission to the data processing system 16. Since the sync word is extracted by the decoding/reproduction system for block identification, clocking, and time base correction, it is important to make it unique from other possible sequences in the data stream. Preferably, the sync code should have the greatest Hamming distance from other 16-bit sequences which might appear in the music data.

G. Editing and Manipulation ADM Music Data

The processor 16 includes a terminal 17 and winchester disk 15 used by an operator to place in the premastered data file identifying and other indicia and/or catalog data, such as author, title, song length, publisher, pricing or royalty codes, dates, version number, etc. Since the multiplexer 14 reformats music data to a form compatible with a conventional desktop personal computer, the data can be easily manipulated, edited and inserted according to know programing techniques. For security purposes, processor 16 may include conventional software for encrypting this information using conventional techniques, so as to avoid unauthorized access thereto. Once edited, processor 16 then transfers the blocked data file representing the original program from the storage disk 15, to a commercially available Sony 1610 or 1630 DMR-2000 video format recording system 18 through a special link to interface them. A multitude of such data files of encoded master programs are processed in this fashion and placed in video tape format by the video recorder 18 in order to create the premastered music libraries. Because the 1610 recorder 18 generates a standard video format magnetic tape but containing ADM music data, high-density CD music ROMs playable on standard CD players can advantageously be produced using standard commercially available CD music ROM mastering services which employ the standard Philips or Sony mastering recorder 20. However, the CD music ROMs would contain our specially encoded master with encrypted catalog and indicia data, as well as the unique 16-bit sync signal.

H. DPS/PCM Interface 19

Interfacing between the data processing system 16 and Sony 1610/1630 video format recorder 18 is attained by providing an interface board 19 which allows the PC to download files to the standard digital serial links on the 1610. The interface 19 is a separate board residing in the data processing system 16. It is comprised of two parallel-to-serial converters with an addressable 1024-byte FIFO buffer in order to receive bytes from the data processing system 16 and to transfer them to a commercially available Sony 1610/1630 system 18. The serial bit rate of the serial channels is served to the video reference clocks (44.1 KHz words per channel) from the 1610/1630 PCM recording system at 176.4 kilobytes per second. Data words of the stereo channels are transmitted from the FIFO buffer in successive bytes to the 1610/1630 system. There is a crystal controlled analog phase-locked loop circuit that tracks the clock in the 1610 Processor and generates a clock signal in the interface circuit to maintain the data rate. Every kilobyte of data generates an interrupt to tell the data processing system 16 to fill the FIFO to achieve asynchronous operation with any standard Sony digital interface.

I. PCM Processor 18 and Recorder 20

The PCM processor employed is a commercially available Sony 1610 or 1630 digital audio processor available from Sony Corporation. In operation, the processor 18 has a 16-bit digital audio input and converts digital data received from the data processing system 16 to a 30 frame/second video format and records it on a standard ¾ inch U-matic video tape recorder. The U-matic tape is then transferred to a conventional CD music ROM manufacturer for making a CD music ROM containing PCM-like data constituting the encoded premastered media used in the decoding/reproduction system describe below.

III. Conclusion

The above description sets for an illustrative method and apparatus for carrying out the invention. In view of the above teachings, many changes and modifications are evident which fall within the spirit of our invention. For example, audio signals generated by the playback device may emanate in analog or digital form, so long as they are high-fidelity as opposed to voice grade. Encoding may be performed by any condensation or high-efficiency sampling method, although Dolby ADM is preferred. A reduced bit (less than 16-bit) PCM encoding method can be employed. Sync writing can be performed by the interface, or written under software control by the data processing system, or even during the encoding process, so long as the sync data ultimately resides in or is appended to the data blocks in the data file stored in the high-density storage media. Indicia data can include a variety of data characteristic to the sound recording. The encoded data file may be written on an optical medium, such as a CD music ROM, or other media such as a winchester disk. Video formatting is a preferred intermediate step between transferring data from the data processing system to the CD music ROM storage device.

Accordingly, we intend to encompass those changes as may come known to those skilled in the art in view of the above teachings.

What is claimed to be secured by United States Letters Patent is as follows:

1. A system for producing on a high-density digital storage medium a plurality of addressable data files representing respective high-fidelity audio programs, said system comprising:
  A. data processing means for processing data and for generating indicia data characterizing said audio programs,
  B. playback means for producing high-fidelity audio signals representing said audio programs,
  C. high-efficiency encoding means for converting said audio signals to encoded digital audio data having a high-density information content adapted for subsequent reproduction at multiples of real time, D. interface means for interfacing said encoding means and said data processing means, said interface means including data blocking means for generating formatted data blocks of said encoded digital audio data and for transmitting said data blocks to said data processing means, and E. memory means responsive to said data processing means for storing said data blocks and corresponding indicia data thereby defining said addressable data files representing said plurality of audio programs.

2. A system as recited in claim 1 wherein said storage medium is used in a high-speed reproduction device for reproducing said audio programs on a slave medium, said system further comprising:

F. bandwidth control means interposed between said playback means and said encoding means for modifying bandwidth of said audio signals according to the bandwidth limitations of said slave medium thereby to reduce the amount of storage space required for processing digital representations of said high-fidelity audio programs.

3. A system as recited in claim 1 wherein said indicia data includes timing information embedded in said data files and said high-density storage medium comprises a non-mapped CD music ROM.

4. A system as recited in claim 2 wherein said indicia data includes timing information embedded in said data files and said high-density storage medium comprises a non-mapped CD music ROM.

5. A system as recited in claim 1 wherein said encoding means comprises digital data condensation means for reducing the number of data bits representative of said audio programs thereby to produce encoded digital data in a condensed format.

6. A system as recited in claim 1 wherein said encoding means comprises high-efficiency sampling means for generating encoded digital signals having a higher information content within a given bandwidth.

7. A system as recited in claim 6 wherein said sampling means comprises a Dolby delta-link adaptive delta modulation digital audio encoder for producing plural digital data streams representing said audio signal.

8. A system as recited in claim 7 wherein said interface means comprises multiplexer means for multiplexing said plural digital data streams and for transferring multiplexed data thereof to said data processing means.

9. A system as recited in claim 1 further comprising monitoring means connected with said data processing means, said monitoring means including decoder means for decoding said encoded digital signals under control of said data processing means thereby to permit playback of audio programs during editing and manipulation of respective data files.

10. A system as recited in claim 9 further comprising editing means for enabling a user to edit said audio programs prior to being stored in said memory recording means.

11. A system as recited in claim 1 wherein said processing means further includes means for generating catalog and pricing information relative to respective audio programs, and for effecting storage of said pricing and catalog information in said data file.

12. A system as recited in claim 1 further comprising Dolby B noise reduction means interposed between said playback means and said encoding means for preprocessing said audio signals to reduce noise content upon playback thereof.

13. A system for enabling production of a CD music ROM containing a plurality of addressable data files representing respective high-fidelity audio programs, said system comprising:

A. video format storage means for storing said addressable data files,

B. data processing means for processing data and for generating catalog and pricing data characterizing respective ones of said audio programs, C. playback means for producing high-fidelity analog audio signals representing said audio programs, D. Dolby encoding means for encoding said analog audio signals thereby to generate plural digital data streams representing audio programs, said data streams being generated at different bit rates, E. interface means for interfacing said Dolby encoding means and said data processing means, said interface means including data blocking means for generating formatted data blocks of said plural digital data streams and for transmitting said data blocks to said data processing means, and F. said data processing means including means for storing said data blocks including said catalog and pricing data in said video format storage means for subsequent storage on a CD music ROM containing said addressable data files representing said plurality of audio programs.

14. A system as recited in claim 13 wherein said playback means includes dual channels for stereo operation, and said encoding means comprises an adaptive delta modulation system for producing three data streams for each of said channels, and said interface means includes means for translating information of said six data streams into a format compatible with said data processing means.

15. A system as recited in claim 13 further comprising Dolby B noise reduction means interposed between said playback means and said encoding means for reducing the noise content of said audio signals.

16. A system as recited in claim 13 wherein said CD music ROM is used in a device for reproducing said audio programs on a slave medium at high speeds, said system further including peak limiting means for limiting predetermined signal peaks occurring in said audio program generated by said playback means.

17. An apparatus for making a premastered digital representation of an audio program comprising:

A. data processing means for processing digital data,

B. dolby processing means for converting said audio program to ADM signals representative of said audio program, said ADM signals comprising a plurality of digital data streams of different bit rates, C. interface means for converting said digital ADM signals to a format compatible with said data processing system, said interface means including means for generating timing data for said dolby processing means thereby to synchronize the operation of said interface means and said dolby processing means, and D. said data processing means utilizing said timing data for storing and handling data blocks representing said data file of the premastered recording of said audio program.

18. An apparatus as recited in claim 17 wherein said data processing means further includes editing means for appending indicia data to said data file.

19. An apparatus as recited in claim 18 wherein said indicia means comprises at least one of author identification, program length, title of said audio program, and pricing information.

20. An apparatus as recited in claim 17 wherein said timing data comprises a unique multi-bit sync code determined by histographic analysis of bit sequences in a plurality of said data files so as to assure uniqueness thereof.

21. An apparatus as recited in claim 17 wherein said interface means includes a data sampling clock generator and a side chain clock generator for driving said dolby processing means and for strobing data therefrom.

22. A method for producing a plurality of addressable digital data files on a non-mapped information storage media wherein each data file represents a high-fidelity sound recording, said method comprising the steps of:
   A. generating analog signals representing said high-fidelity sound recording,
   B. digitally encoding said analog signals to form digital audio data,
   C. generating n-bit data segments representing said digital audio data,
   D. appending to each n-bit data segment an m-bit sync code substantially unique from m-bit sequences in said data segments, and
   E. supplying said data segments and said sync code to a data processing system and writing a data file comprising digital representations of said audio programs which are retrievable according to said sync codes.

23. A method as recited in claim 22 wherein the encoding step is performed by adaptive delta modulation techniques.

24. A method as recited in claim 23 further including, before the encoding step, peaking-limiting the analog audio signal by limiting the signals of a predetermined amplitude and duration prior to encoding.

25. A method as recited in claim 22 further including the step of editing the data files by adding catalog and pricing information to said data file prior to writing.

26. A method as recited in claim 22 wherein the writing step is performed according to a video format, and further comprising the step of converting the video format to a CD music ROM format.

* * * * *